United States Patent
Ma

(10) Patent No.: US 12,045,415 B2
(45) Date of Patent: Jul. 23, 2024

(54) TOUCH DISPLAY PANEL CAPABLE OF REDUCING THE NUMBER OF BONDING PADS AND ELECTRONIC DEVICE

(71) Applicant: WUHAN CHINA STAR OPTOELECTRONICS SEMICONDUCTOR DISPLAY TECHNOLOGY CO., LTD., Hubei (CN)

(72) Inventor: Liang Ma, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/597,029

(22) PCT Filed: Dec. 20, 2021

(86) PCT No.: PCT/CN2021/139535
§ 371 (c)(1),
(2) Date: Dec. 22, 2021

(87) PCT Pub. No.: WO2023/103068
PCT Pub. Date: Jun. 15, 2023

(65) Prior Publication Data
US 2024/0028157 A1    Jan. 25, 2024

(30) Foreign Application Priority Data
Dec. 12, 2021  (CN) .......................... 202111513112.3

(51) Int. Cl.
*G06F 3/041*    (2006.01)

(52) U.S. Cl.
CPC .............................. *G06F 3/04166* (2019.05)

(58) Field of Classification Search
CPC .. G06F 3/04166; G06F 3/0412; G06F 3/0416; G06F 3/041; G06F 3/04164; G06F 3/0443; G06F 3/0446
See application file for complete search history.

(56) References Cited

U.S. PATENT DOCUMENTS 10,732,752 B1 * 8/2020 Zhu ........................ G06F 3/0416
11,269,451 B2 * 3/2022 Fang .................. G06F 3/041661
(Continued)

FOREIGN PATENT DOCUMENTS

| CN | 104866158 A | 8/2015 |
| CN | 106293177 A | 1/2017 |

(Continued)

OTHER PUBLICATIONS

Chinese Office Action issued in corresponding Chinese Patent Application No. 202111513112.3 dated Mar. 31, 2023, with English translation; 27 pages provided.

*Primary Examiner* — Rodney Amadiz
(74) *Attorney, Agent, or Firm* — HSML P. C.

(57) ABSTRACT

A touch display panel and an electronic device are provided. The electronic device has a touch display panel. The touch display panel has a plurality of touch electrodes, at least two demultiplexing circuit units, and a plurality of bonding pads. The demultiplexing circuit unit has a plurality of demultiplexing circuits. The number of bonding pads can be further reduced by electrically connecting the demultiplexing circuits in different demultiplexing circuit units to the same bonding pad.

8 Claims, 6 Drawing Sheets

(56) References Cited

U.S. PATENT DOCUMENTS

| | | |
|---|---|---|
| 2016/0328072 A1 | 11/2016 | Yang |
| 2017/0052629 A1 | 2/2017 | Lin et al. |
| 2017/0160844 A1* | 6/2017 | Li ........................ G02F 1/13338 |
| 2017/0168629 A1 | 6/2017 | Lai et al. |
| 2019/0025966 A1* | 1/2019 | Xing ........................ G06F 3/044 |

FOREIGN PATENT DOCUMENTS

| | | |
|---|---|---|
| CN | 106537315 A | 3/2017 |
| CN | 106997249 | 8/2017 |
| CN | 107045412 | 8/2017 |
| CN | 107452307 | 12/2017 |
| CN | 113064513 A | 7/2021 |
| CN | 113485587 | 10/2021 |

* cited by examiner

TOUCH DISPLAY PANEL CAPABLE OF REDUCING THE NUMBER OF BONDING PADS AND ELECTRONIC DEVICE

FIELD OF INVENTION

The present disclosure relates to the technical field of display, which particularly relates to a touch display panel and an electronic device.

BACKGROUND OF INVENTION

At present, the touch function has become the standard configuration of most electronic devices, wherein capacitive touch display panels are widely used. The basic principle is to use tools such as fingers or stylus to generate capacitance with the touch display panel. Whether the panel is touched, and the coordinates of the touch point are determined by the electrical signal formed by the capacitance change before and after the touch.

SUMMARY OF INVENTION

Technical Problems: an important touch technology of capacitive touch display panels is self-capacitive, which can realize the touch function through a single layer of metal electrodes. The self-capacitive touch display panel has a large number of wires and bonding pads. By introducing the demultiplexing circuit structure, the wires from the touch area pass through the demultiplexing circuit structure before connecting to the bonding pads. The number of touch channel signals is reduced exponentially, and then connected to the bonding pads, thereby reducing the number of bonding pads to a certain extent. However, after increasing the demultiplexing circuit structure, the design space obtained by reducing the number of bonding pads still cannot meet the architecture design of the existing touch function and display function.

As mentioned above, the existing touch display panel has the problem of a large number of bonding pads. Thus, it is necessary to provide a touch display panel and an electronic device to improve this defect.

Technical Solutions: the embodiment of the present disclosure provides a touch display panel and an electronic device, which are used to solve the problem of a large number of bonding pads existing in the existing touch display panel.

The embodiment of the present disclosure provides a touch display panel, comprises:
  a plurality of touch electrodes arranged in rows at intervals along a first direction and disposed in columns at intervals along a second direction, wherein the first direction is different from the second direction;
  at least two demultiplexing circuit units respectively electrically connected to the touch electrodes in different columns, wherein the demultiplexing circuit unit includes a plurality of demultiplexing circuits; and a plurality of bonding pads;
  wherein at least one demultiplexing circuit in the demultiplexing circuit unit and at least one of the corresponding demultiplexing circuits in another demultiplexing circuit unit are electrically connected to the same bonding pad.

According to an embodiment of the present disclosure, at least one demultiplexing circuit in the demultiplexing circuit unit and the demultiplexing circuit that is simultaneously driven in another demultiplexing circuit unit are electrically connected by wiring.

According to an embodiment of the present disclosure, an output end of the demultiplexing circuit is electrically connected to the touch electrode, an input end of at least one demultiplexing circuit in the demultiplexing circuit unit and an input end of at least one of the corresponding demultiplexing circuits in another demultiplexing circuit unit are electrically connected to the same bonding pad.

According to an embodiment of the present disclosure, a control end of at least one demultiplexing circuit in the demultiplexing circuit unit and a control end of at least one of the corresponding demultiplexing circuits in another demultiplexing circuit unit are electrically connected to the same bonding pad.

According to an embodiment of the present disclosure, the demultiplexing circuit includes first-stage sub-demultiplexing circuits and second-stage sub-demultiplexing circuits arranged in cascade, the second-stage sub-demultiplexing circuits are electrically connected to the corresponding first-stage sub-demultiplexing circuits, and an output end of each of the first-stage sub-demultiplexing circuits is electrically connected to a corresponding touch electrode.

According to an embodiment of the present disclosure, the touch display panel includes touch drive signal lines and touch drive control signal lines, and the touch drive signal lines and the touch drive control signal lines are respectively electrically connected to different bonding pads;
  wherein a first input end of at least one first-stage sub-demultiplexing circuit in the demultiplexing circuit unit and a first input end of at least one of the corresponding first-stage sub-demultiplexing circuits in another demultiplexing circuit unit are electrically connected to the same touch drive signal line;
  a first control end of at least one first-stage sub-demultiplexing circuit in the demultiplexing circuit unit and a first control end of at least one of the corresponding first-stage sub-demultiplexing circuits in another demultiplexing circuit unit are electrically connected to the same touch drive control signal line.

According to an embodiment of the present disclosure, the first-stage sub-demultiplexing circuit includes a first thin film transistor, and a drain of the first thin film transistor is electrically connected to the corresponding touch electrode;
  wherein a source of the first thin film transistor corresponding to at least one touch electrode in the m-th row and a source of the first thin film transistor corresponding to another touch electrode in m-th row located in different demultiplexing circuit unit are electrically connected to the same touch drive signal line;
  a gate of the first thin film transistor corresponding to at least one touch electrode in m-th row and a gate of the first thin film transistor corresponding to another touch electrode in m-th row located in different demultiplexing circuit unit are electrically connected to the same touch drive control signal line;
  wherein m is an integer greater than or equal to 1.

According to an embodiment of the present disclosure, the touch display panel further includes a plurality of touch sensing control signal lines;
  wherein a second input end of the first-stage sub-demultiplexing circuit is electrically connected to an output end of the second-stage sub-demultiplexing circuit, and a second control end of at least one first-stage sub-demultiplexing circuit in the demultiplexing circuit unit and a second control end of at least one of the corresponding first-stage sub-demultiplexing circuits in another demultiplexing circuit unit are electrically connected to the same touch sensing control signal line.

According to an embodiment of the present disclosure, the first-stage sub-demultiplexing circuit includes a second thin film transistor, a drain of the second thin film transistor and the drain of the first thin film transistor are electrically connected to the same touch electrode, and a source of the second thin film transistor is electrically connected to the output end of the second-stage sub-demultiplexing circuit;

wherein a gate of the second thin film transistor corresponding to at least one touch electrode in the m-th and a gate of the second thin film transistor corresponding to another touch electrode in the m-th located in different demultiplexing circuit unit are electrically connected to the same touch sensing control signal line.

According to an embodiment of the present disclosure, a control end of the second-stage sub-demultiplexing circuit in the demultiplexing circuit unit and a control end of the second-stage sub-demultiplexing circuit in another demultiplexing circuit unit are electrically connected to different bonding pads.

According to an embodiment of the present disclosure, a control end of the second-stage sub-demultiplexing circuit in the demultiplexing circuit unit and a control end of the second-stage sub-demultiplexing circuit in another demultiplexing circuit unit are electrically connected to the same bonding pad.

According to an embodiment of the present disclosure, the touch display panel further includes sensing-channel switch control signal lines and sensing channels, the sensing-channel switch control signal lines and the sensing channels are electrically connected to different bonding pads, respectively, and the second-stage sub-demultiplexing circuit includes a third thin film transistor;

wherein a gate o the third thin film transistor is electrically connected to the sensing-channel switch control signal line, a source of the third thin film transistor is electrically connected to the sensing channel, and a drain of the third thin film transistor is electrically connected to an input end of the first-stage sub-demultiplexing circuits in the same demultiplexing circuit unit.

According to an embodiment of the present disclosure, a gate of the third thin film transistor in the demultiplexing circuit unit and a gate of the third thin film in another demultiplexing circuit unit are connected to the same sensing-channel switch control signal line.

The embodiment of the present disclosure further provides an electronic device, includes a touch display panel, wherein the touch display panel comprise:

a plurality of touch electrodes arranged in rows at intervals along a first direction and disposed in columns at intervals along a second direction, wherein the first direction is different from the second direction;

at least two demultiplexing circuit units respectively electrically connected to the touch electrodes in different columns, wherein the demultiplexing circuit unit includes a plurality of demultiplexing circuits; and a plurality of bonding pads;

wherein at least one demultiplexing circuit in the demultiplexing circuit unit and at least one of the corresponding demultiplexing circuits in another demultiplexing circuit unit are electrically connected to the same bonding pad.

According to an embodiment of the present disclosure, at least one demultiplexing circuit in the demultiplexing circuit unit and the demultiplexing circuit that is simultaneously driven in another demultiplexing circuit unit are electrically connected by wiring.

According to an embodiment of the present disclosure, an output end of the demultiplexing circuit is electrically connected to the touch electrode, an input end of at least one demultiplexing circuit in the demultiplexing circuit unit and an input end of at least one of the corresponding demultiplexing circuits in another demultiplexing circuit unit are electrically connected to the same bonding pad.

According to an embodiment of the present disclosure, a control end of at least one demultiplexing circuit in the demultiplexing circuit unit and a control end of at least one of the corresponding demultiplexing circuits in another demultiplexing circuit unit are electrically connected to the same bonding pad.

According to an embodiment of the present disclosure, the demultiplexing circuit includes first-stage sub-demultiplexing circuits and second-stage sub-demultiplexing circuits arranged in cascade, the second-stage sub-demultiplexing circuits are electrically connected to the corresponding first-stage sub-demultiplexing circuits, and an output end of each of the first-stage sub-demultiplexing circuits is electrically connected to a corresponding touch electrode.

According to an embodiment of the present disclosure, the touch display panel includes touch drive signal lines and touch drive control signal lines, and the touch drive signal lines and the touch drive control signal lines are respectively electrically connected to different bonding pads;

wherein a first input end of at least one first-stage sub-demultiplexing circuit in the demultiplexing circuit unit and a first input end of at least one of the corresponding first-stage sub-demultiplexing circuits in another demultiplexing circuit unit are electrically connected to the same touch drive signal line;

a first control end of at least one first-stage sub-demultiplexing circuit in the demultiplexing circuit unit and a first control end of at least one of the corresponding first-stage sub-demultiplexing circuits in another demultiplexing circuit unit are electrically connected to the same touch drive control signal line.

According to an embodiment of the present disclosure, the first-stage sub-demultiplexing circuit includes a first thin film transistor, and a drain of the first thin film transistor is electrically connected to the corresponding touch electrode;

wherein a source of the first thin film transistor corresponding to at least one touch electrode in the m-th row and a source of the first thin film transistor corresponding to another touch electrode in m-th row located in different demultiplexing circuit unit are electrically connected to the same touch drive signal line;

a gate of the first thin film transistor corresponding to at least one touch electrode in m-th row and a gate of the first thin film transistor corresponding to another touch electrode in m-th row located in different demultiplexing circuit unit are electrically connected to the same touch drive control signal line;

wherein m is an integer greater than or equal to 1.

Beneficial Effects: the embodiments of the present disclosure provide a touch display panel and an electronic device, wherein the electronic device includes the touch display panel. The touch display panel includes a plurality of touch electrodes, at least two demultiplexing circuit units, and a plurality of bonding pads. The touch electrodes are arranged in rows at intervals along a first direction and arranged in columns at intervals along a second direction. The first direction is different from the second direction. The demultiplexing circuit units are electrically connected to the touch electrodes in different columns, each of the demultiplexing circuit units includes a plurality of demultiplexing circuits. At least one demultiplexing circuit in the demultiplexing circuit unit and at least one of the corresponding demultiplexing circuits in another demultiplexing circuit unit are electrically connected to the same bonding pad. The number of bonding pads can be further reduced by electrically connecting the demultiplexing circuits in different demultiplexing circuit units to the same bonding pad.

DESCRIPTION OF DRAWINGS

In order to more clearly illustrate the technical solutions in the embodiments or the prior art, the following will briefly introduce the drawings needed to be used in the description of the embodiments or the prior art. Obviously, the drawings in the following description are only some of the disclosed embodiments. For those of ordinary skill in the art, other drawings can be obtained based on these drawings without creative work.

DETAILED DESCRIPTION OF PREFERRED EMBODIMENTS

Figure 1:
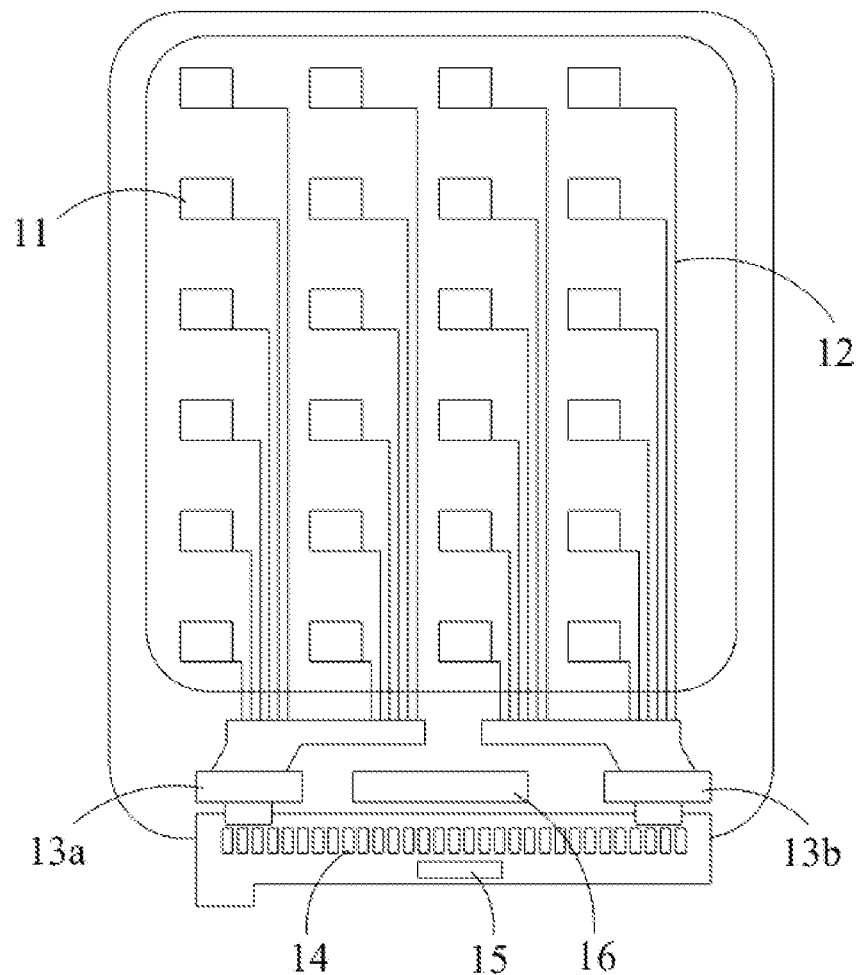
FIG. 1 is a schematic structural diagram of a touch display panel in the prior art.

The description of the following embodiments refers to the attached drawings to illustrate specific embodiments that the present disclosure can be implemented. The directional terms mentioned in the present disclosure, such as up, down, front, back, left, right, inside, outside, side, etc., are only directions with reference to the attached drawings. Therefore, the directional terms used are used to illustrate and understand the present disclosure, rather than to limit the present disclosure. In the figures, the units with similar structures are indicated by the same reference numerals.

The present disclosure will be further described below in conjunction with the drawings and specific embodiments:

With the development of display technology, touch function has become standard for most electronic devices. The existing touch display panel adopting single-layer mutual-capacitive touch technology reduces the thickness of the touch layer by arranging touch sensing electrodes, touch driving electrodes, and touch signal lines on the same film layer. However, it will not only compress the design space of the touch display panel, but also increase the number of bonding pads used to bond and connect the touch signal line with the touch drive integrated circuit. As a result, the design difficulty of the touch display panel increases, and the yield rate of the bonding process decreases. The embodiments of the present disclosure provide a touch display panel and an electronic device, the number of bonding pads in the touch display panel can be reduced, the design space of the touch display panel can be improved, the design difficulty of the touch display panel can be reduced, and the yield rate of the manufacturing process of the touch display panel can be improved.

As shown in FIG. 1, FIG. 1 is a schematic structural diagram of a touch display panel in the prior art. The touch display panel includes a plurality of touch electrodes 11, a plurality of touch wires 12, two demultiplexing circuit units 13a and 13b, a plurality of bonding pad 14, a touch integrated circuit 15, and a display integrated circuit 16. The touch wires 12 are respectively led out to the demultiplexing circuit unit 13a and the demultiplexing circuit unit 13b through the lower frame of the touch display panel. Then, it is led to the bonding pads 14 through the demultiplexing circuit unit 13a and the demultiplexing circuit unit 13b.

In the structure shown in FIG. 1, the common signals of the demultiplexing circuit unit 13a and the demultiplexing circuit unit 13b need to be led out to their corresponding bonding pads 14 respectively, which will undoubtedly increase the number of bonding pads 15.

Figure 2:
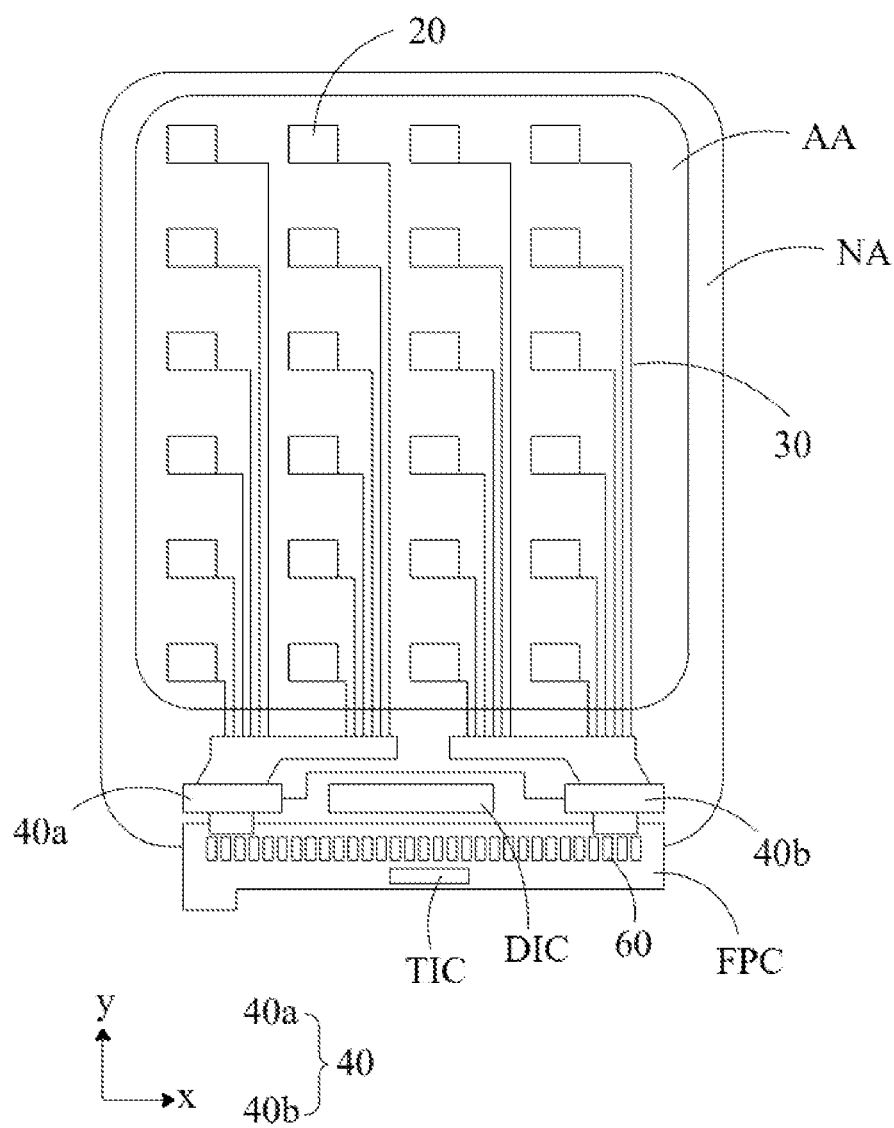
FIG. 2 is a schematic structural diagram of a first touch display panel according to an embodiment of the present disclosure.

The embodiment of the present disclosure provides a touch display panel. As shown in FIG. 2, FIG. 2 is a schematic structural diagram of a first touch display panel according to an embodiment of the present disclosure. The touch display panel includes a display area AA and a non-display area NA arranged at a periphery of the display area AA. The touch display panel further includes a plurality of touch electrodes 20, and the touch electrodes 20 are all disposed in the display area AA.

The plurality of the touch electrodes 20 are arranged in rows at intervals along the first direction x, the plurality of touch electrodes 20 are disposed in columns at intervals along a second direction y, and the first direction x is different from the second direction y.

In the embodiment of the present disclosure, the first direction x is a horizontal direction, and the second direction y is a vertical direction perpendicular to the first direction x.

It should be noted that FIG. 2 only illustrates the arrangement of touch electrodes 20, and the size and number of touch electrodes 20 in FIG. 2 do not represent the size and number of touch electrodes 20 in practical applications.

The touch display panel further includes a plurality of touch wires 30 and at least two demultiplexing circuit units 40. Each of the touch electrodes 20 is electrically connected to a corresponding touch wire 30. The at least two demultiplexing circuit units 40 are electrically connected to touch electrodes in different columns through each of the touch wires 30, so as to transmit the touch driving signals or touch sensing signals to the corresponding touch electrodes 20 through the touch wires 30.

Figure 3:
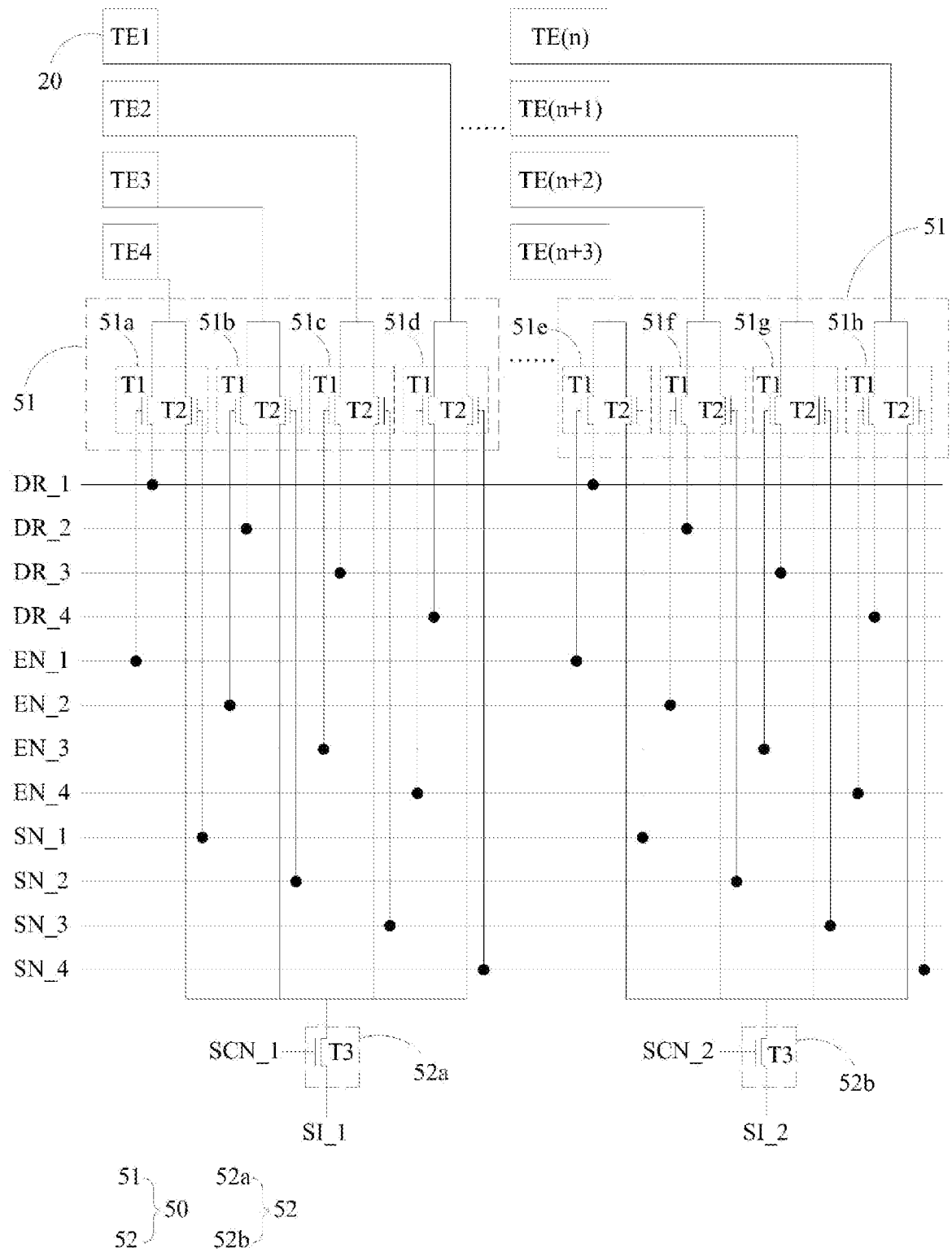
FIG. 3 is a schematic structural diagram of a first demultiplexing circuit unit according to an embodiment of the present disclosure.

As shown in FIG. 3, FIG. 3 is a schematic structural diagram of a first demultiplexing circuit unit according to an embodiment of the present disclosure. Each of the demultiplexing circuit units 40 includes a plurality of demultiplexing circuits 50, and an output end of the demultiplexing circuit 50 is connected to the corresponding touch electrode 20 through the touch wires 30.

As shown in FIG. 2, the touch display panel further includes a plurality of bonding pads 60. The bonding pads 60 are arranged in the non-display area NA and located on one side of the lower edge of the display area AA. An input end or the control end of the demultiplexing circuit 50 is electrically connected to the corresponding bonding pad 60 by wiring.

The touch display panel further includes a touch integrated circuit TIC and a display integrated circuit DIC.

In the embodiment of the present disclosure, the display integrated circuit DIC is bonded and connected to the non-display area NA of the touch display panel and is located on one side of the lower edge of the display area AA. In other embodiments, the display integrated circuit DIC may also be bonded and connected to the flexible printed circuit board FPC.

The touch integrated circuit DIC is bound and connected to the flexible printed circuit board FPC. The flexible printed circuit board FPC is bonded and connected to the bonding pad 60 to transmit the touch driving signals or touch sensing signals generated by the touch integrated circuit TIC to the corresponding touch electrode 20 through the bonding pad 60.

At least one demultiplexing circuit 50 in the demultiplexing circuit unit and at least one of the corresponding demultiplexing circuits 50 in another demultiplexing circuit unit 40 are electrically connected to the same bonding pad 60. In this way, the commonly connected bonding pad 60 may be used to transfer the signals shared by different demultiplexing circuit units 40 to the demultiplexing circuit units 40. Compared with the prior art shown in FIG. 1, the number of bonding pads 60 may be further reduced.

In the embodiment of the present disclosure, as shown in FIG. 2, the demultiplexing circuit unit 40 includes a first demultiplexing circuit unit 40a and a second demultiplexing circuit unit 40b. The first demultiplexing circuit unit and the second demultiplexing circuit unit 40b are respectively arranged on the left and right sides of the display integrated circuit TIC and may be arranged symmetrically with respect to the display integrated circuit TIC.

The first demultiplexing circuit unit 40a is electrically connected to the rows of touch electrodes 20 in the left half of the display area AA through the touch wires 30. The second demultiplexing circuit unit 40b is electrically connected to the columns of touch electrodes 20 in the right half of the display area AA through the touch wires 30. Further, an output end of the demultiplexing circuit 50 is electrically connected to the touch electrode 20. An input end of at least one demultiplexing circuit 50 in the demultiplexing circuit unit 40 is electrically connected to an input end of at least one of the corresponding the demultiplexing circuits 50 in another demultiplexing circuit unit 40 are electrically connected to the same bonding pad.

As shown in FIG. 3, in the embodiment of the present disclosure, the demultiplexing circuit 50 includes a first-stage sub-demultiplexing circuit 51 and a second-stage sub-demultiplexing circuit 52 arranged in cascade. The second-stage sub-demultiplexing circuit 52 is electrically connected to the corresponding first-stage sub-demultiplexing circuits 51. An output end of each of the first-stage sub-demultiplexing circuits 51 is electrically connected to a corresponding touch electrode 20.

The wires of the touch display panel include touch drive signal lines DR and touch drive control signal lines EN. The touch drive signal lines DR and the touch drive control signal lines EN are respectively electrically connected to different bonding pads 60.

As shown in FIG. 3, the first input end of the first-stage sub-demultiplexing circuit 51 is electrically connected to the touch drive signal line DR to receive the touch drive signal. The first control end of the first-stage sub-demultiplexing circuit 51 is electrically connected to the touch drive control signal line EN. The first-stage sub-demultiplexing circuit 51 is controlled to be turned on and off by the touch drive control signal.

Further, the first control end of at least one the demultiplexing circuit 50 in the demultiplexing circuit unit 40 and the first control end of at least one of the corresponding demultiplexing circuits 50 in another demultiplexing circuit unit 40 are electrically connected to the same bonding pad 60.

Further, the first control end of at least one first-stage sub-demultiplexing circuit 51 in the demultiplexing circuit unit 40 and the first control end of at least one of the corresponding first-stage sub-demultiplexing circuits 51 in another demultiplexing circuit unit 40 are electrically connected to the same touch drive control signal line EN.

The first input end of at least one first-stage sub-demultiplexing circuit 51 in the demultiplexing circuit unit 40 and the first input end of at least one of the corresponding first-stage sub-demultiplexing circuit 51 in another demultiplexing circuit unit 40 are electrically connected to the same touch drive signal line DR.

As shown in FIG. 3, FIG. 3 only illustrates the first column of touch electrodes 20 connected to the first demultiplexing circuit unit 40a and the n-th column of touch electrodes 20 connected to the second demultiplexing circuit 40b. The first column of touch electrodes 20 connected to the first demultiplexing circuit unit 40a includes touch electrodes TE1, TE2, TE3, TE4, and the n-th column of touch electrodes 20 connected to the second demultiplexing circuit 40b includes touch electrodes TE(n), TE(n+1), TE(n+2), TE(n+3).

The first-stage sub-demultiplexing circuit 51 in the first demultiplexing circuit unit 40a includes first-stage sub-demultiplexing circuits 51a, 51b, 51c, and 51d. The first-stage sub-demultiplexing circuit 51 in the second demultiplexing circuit unit 40b includes first-stage sub-demultiplexing circuits 51e, 51f, 51g, and 51h.

The touch driving signal line DR includes touch driving signal lines DR_1, DR_2, DR_3, and DR_4, and the touch driving control signal line EN includes touch driving control signal lines EN_1, EN_2, EN_3, and EN_4. In the embodiment of the present disclosure, at least one of the demultiplexing circuit 50 in the demultiplexing circuit unit 40 is electrically connected to the demultiplexing circuit 50 that is simultaneously driven in another demultiplexing circuit unit 40 through by wiring.

Take touch electrodes TE1 and TE(n) as an example for illustration. TE1 is electrically connected to the output end of the first-stage sub-demultiplexing circuit 51a, and TE(n) is electrically connected to the output end of the first-stage sub-demultiplexing circuit 51e. The first input end of the first-stage sub-demultiplexing circuit 51a in the first demultiplexing circuit unit and the first input end of the corresponding first-stage sub-demultiplexing circuit 51e in the second demultiplexing circuit unit 40b are electrically connected through the touch drive signal line DR_1. The first control end of the first-stage sub-demultiplexing circuit 51a and the first-stage sub-demultiplexing circuit 51e are electrically connected through the touch drive control signal line EN_1.

A touch drive control signal line EN_1 is used to simultaneously output touch drive control signals to the first control end of the first-stage sub-demultiplexing circuit 51a and the first-stage sub-demultiplexing circuit 51e, so that the first-stage sub-demultiplexing circuit 51a and the first-stage sub-demultiplexing circuit 51e are turned on at the same time. One touch drive signal line DR_1 simultaneously transmits touch drive signals to the touch electrodes TE1 and TE(n), so that one touch drive signal line DR_1 and one touch drive control signal line EN_1 may be used to connect the two corresponding first-stage sub-demultiplexing circuits 51a, 51e in the first demultiplexing circuit unit 40a and the second demultiplexing circuit unit 40b. In this way, the effect of driving the touch electrodes TE1 and TE(n) at the same time may be achieved. The touch drive signal line DR_1 is electrically connected to a corresponding bonding pad 60, and the touch drive control signal line EN_1 is electrically connected to a corresponding bonding pad 60. The touch electrodes 20 controlled by two different demultiplexing circuit units may be driven at the same time through the same bonding pad 60, so that the number of bonding pads 60 may be effectively reduced.

It should be noted that the foregoing embodiment only uses touch electrodes TE1 and TE(n) as examples for description. For the connection manners of other touch electrodes and the first-stage sub-demultiplexing circuit, touch drive signal lines, and touch drive control signal lines, please refer to the touch electrodes TE1 and TE(n), which will not be repeated here.

Further, the first-stage sub-demultiplexing circuit 51 includes a first thin film transistor T1. The gate of the first thin film transistor T1 is electrically connected to the touch drive control signal line EN, the source of the first thin film transistor T1 is electrically connected to the touch drive signal line DR, and the drain of the first thin film transistor T1 is electrically connected to a corresponding touch electrode 20.

The source of the first thin film transistor T1 corresponding to at least one touch electrode 20 in the m-th row and the source of the first thin film transistor T1 corresponding to another touch electrodes 20 in the m-th row located in a different demultiplexing circuit unit 40 are electrically connected to the same touch drive signal line DR. The gate of the first thin film transistor T1 corresponding to at least one touch electrode 20 in the m-th row and the gate of the first thin film transistor T1 corresponding to at least another touch electrode 20 in the m-th row located in a different demultiplexing circuit unit 40 are electrically connected to the same touch drive control signal line EN, wherein, m is an integer greater than or equal to 1.

As shown in FIG. 1, when m=1, the source of the first thin film transistor T1 of the first-stage sub-demultiplexing circuit 51a and the source of the first thin-film transistor T1 of the first-stage sub-demultiplexing circuit 51e are both electrically connected to the touch drive signal line DR_1, and the gate of the first thin film transistor T1 of the first-stage sub-demultiplexing circuit 51a and the gate of the first thin-film transistor T1 of the first-stage sub-demultiplexing circuit 51e are both electrically connected to the touch drive control signal line EN_1. When m=2, the source of the first thin film transistor T1 of the first-stage sub-demultiplexing circuit 51b and the source of the first thin-film transistor T1 of the first-stage sub-demultiplexing circuit 51f are both electrically connected to the touch Drive signal line DR_2, and the gate of the first thin film transistor T1 of the first-stage sub-demultiplexing circuit 51b and the gate of the first thin-film transistor T1 of the first-stage sub-demultiplexing circuit 51f are both electrically connected to the touch drive control signal line EN_2.

By analogy, when m is any positive integer, the source of the first thin film transistor T1 corresponding to any touch electrode 20 in the m-th row and the source of the first thin film transistor T1 corresponding to the other touch electrodes 20 in the m-th row located in a different demultiplexing circuit unit are electrically connected to the same touch drive signal line DR. The gate of the first thin film transistor T1 corresponding to any touch electrode 20 located in the m-th row and the gate of the first thin film transistor T1 corresponding to the other touch electrode 20 in the m-th row located in a different demultiplexing circuit unit 40 are electrically connected to the same touch drive control signal line EN.

In the embodiment shown in FIG. 3, The source of the first thin film transistor T1 corresponding to any touch electrode 20 in the m-th row and the source of the first thin film transistor T1 corresponding to the other touch electrode 20 in the m-th row located in the same demultiplexing circuit unit 40 are further electrically connected to the same touch drive signal line DR. The gate of the first thin film transistor T1 corresponding to any touch electrode 20 in the m-th row and the gate of the first thin film transistor T1 corresponding to the other touch electrode 20 in the m-th row located in the same demultiplexing circuit unit 40 are further electrically connected to the same touch drive control signal line EN. In this way, the entire row of touch electrodes may be scanned on the touch display panel through the touch integrated circuit TIC.

Further, the touch display panel further includes a plurality of touch sensing control signal lines SN. The second input end of the first-stage sub-demultiplexing circuit 51 is electrically connected to the output end of the second-stage sub-demultiplexing circuit 52. The second control end of at least one first-stage sub-demultiplexing circuit 51 in the demultiplexing circuit unit 40 and the second input end of at least one of the corresponding first-stage sub-demultiplexing circuits 51 in another demultiplexing circuit units 40 are electrically connected to the same touch sensing control signal line SN.

As shown in FIG. 3, the touch sensing control signal lines SN include touch sensing control signal lines SN_1, SN_2, SN_3, and SN_4. The second control end of the first-stage sub-demultiplexing circuit 51a and the second control end of the first-stage sub-demultiplexing circuit 51e are electrically connected through the touch sensing control signal line SN_1. The second control end of the first-stage sub-demultiplexing circuit 51b and the second control end of the first-stage sub-demultiplexing circuit 51f are electrically connected through the touch sensing control signal line SN_2. The second control end of the first-stage sub-demultiplexing circuit 51c and the second control end of the first-stage sub-demultiplexing circuit 51g are electrically connected through the touch sensing control signal line SN_3. The second control end of the first-stage sub-demultiplexing circuit 51d and the second control end of the first-stage sub-demultiplexing circuit 51h are electrically connected through the touch sensing control signal line SN_4.

Understandably, a touch sensing control signal line SN may simultaneously output touch sensing control signals to the second control end of the first-stage sub-demultiplexing circuit 51a and the first-stage sub-demultiplexing circuit 51e, so that the second control ends of the first-stage sub-demultiplexing circuit 51a and the first-stage sub-demultiplexing circuit 51e are turned on at the same time.

Take touch electrodes TE1 and TE(n) as an example for illustration. The second control end of the first-stage sub-demultiplexing circuit 51a and the second control end of the first-stage sub-demultiplexing circuit 51e are electrically connected to the touch sensing control signal line SN_1, and the second-stage sub-demultiplexing circuit 52a and the second-stage sub-demultiplexing circuit 52b simultaneously output touch sensing signals to the touch electrodes TE1 and TE(n). Thus, a touch sensing control signal may be used to achieve the effect of simultaneously sensing the touch electrodes TE1 and TE(n). The touch sensing control signal line SN_1 is electrically connected to a corresponding bonding pad 60. In this way, two touch electrodes may be sensed at the same time through a bonding pad 60, thereby effectively reducing the number of bonding pads 60.

As shown in FIG. 3, the first-stage sub-demultiplexing circuit 51 further includes a second thin film transistor T2. In the same first-stage sub-demultiplexing circuit 51, the drain of the second thin film transistor T2 and the drain of the first thin film transistor T1 are electrically connected to the same touch electrode 20. The sources of the second thin film transistors T2 of the first-stage sub-demultiplexing circuits 51 located in the same demultiplexing circuit unit 40 are electrically connected to the output end of the same second-stage sub-demultiplexing circuit 52.

Further, the gate of the second thin film transistor T2 corresponding to at least one touch electrodes in the m-th row and the gate of the second thin film transistor T2 corresponding to another touch electrodes in the m-th row located in a different demultiplexing circuit unit are electrically connected to the same touch sensing control signal line SN.

As shown in FIG. 3, when m=1, the gate of the second thin film transistor T2 of the first-stage sub-demultiplexing circuit 51a and the gate of the second thin film transistor T2 of the first-stage sub-demultiplexing circuit 51e are electrically connected to the touch sensing control signal line SN_1. When m=2, the gate of the second thin film transistor T2 of the first-stage sub-demultiplexing circuit 51b and the gate of the second thin film transistor T2 of the first-stage sub-demultiplexing circuit 51f are electrically connected to the touch sensing control signal line SN_2. By analogy, when m is any positive integer, the gate of the second thin film transistor T2 corresponding to any touch electrode 20 in the m-th row and the gate of the second thin film transistor T2 corresponding to the other touch electrode 20 in the m-th row located in a different demultiplexing circuit unit 40 are connected to the same touch sensing control signal line SN.

In actual use, when m is any positive integer, the gate of the second thin film transistor T2 corresponding to any touch electrode 20 in the m-th row and the gate of the second thin film transistors T2 corresponding to the other touch electrode 20 in the m-th row located in the same demultiplexing circuit unit 40 are connected to the same touch sensing control signal line SN.

In one of the embodiments, the touch display panel includes a plurality of touch electrode units. Each of the touch electrode units includes at least two rows of the touch electrodes. The source of the first thin film transistor corresponding to the touch electrode in the m-th row and the n-th column of the touch electrode unit and the source electrode of the first thin film transistor corresponding to the touch electrode in the m-th row and the n-th column in another touch electrode unit located in a different demultiplexing circuit unit are connected to the same touch drive signal line. The gate of the first thin film transistor corresponding to the touch electrode in the m-th row and the n-th column of the touch electrode unit and the gate of the first thin film transistor corresponding to the touch electrode in the m-th row and the n-th column in another touch electrode unit located in a different demultiplexing circuit unit are connected to the same touch drive control signal line, where n is an integer greater than or equal to 1.

Figure 4:
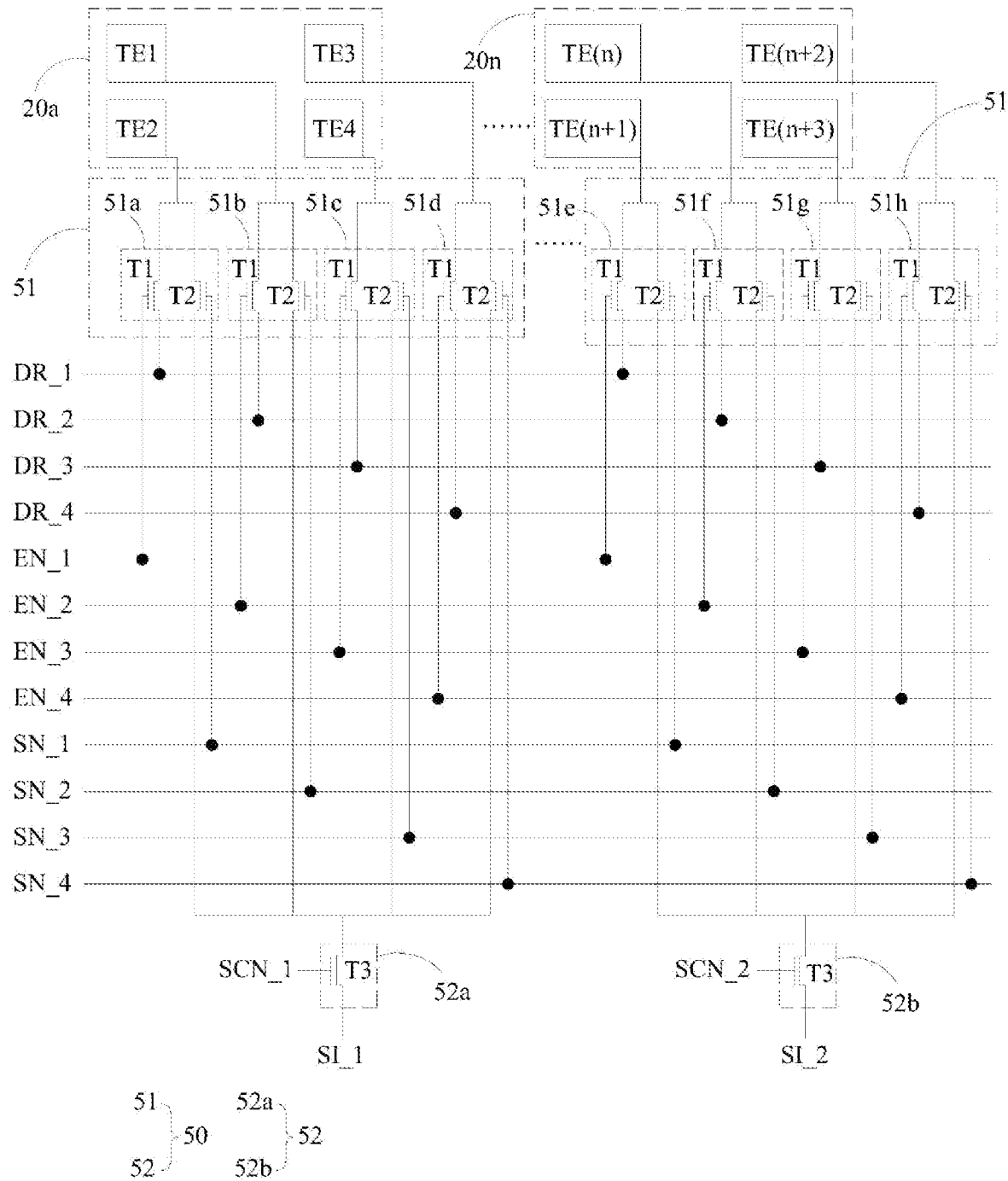
FIG. 4 is a schematic structural diagram of a second demultiplexing circuit unit according to an embodiment of the present disclosure.

As shown in FIG. 4, FIG. 4 is a schematic structural diagram of a second demultiplexing circuit unit according to an embodiment of the present disclosure. It should be noted that the structure of the second type of demultiplexing circuit unit shown in FIG. 4 is roughly the same as the structure of the first type of demultiplexing circuit unit shown in FIG. 3. The difference is that the touch display panel includes a plurality of touch electrode units, each of the touch electrode units includes at least two rows of the touch electrodes, and each of the demultiplexing circuit units may be electrically connected to one or more of the touch electrode units.

FIG. 4 only illustrates two touch electrode units, namely the touch electrode unit 20a and the touch electrode unit 20n. The touch electrode unit 20a and the touch electrode unit 20n include two rows of touch electrodes 20, wherein the touch electrode unit 20a includes touch electrodes TE1, TE2, TE3, TE4, and the touch electrode unit 20n includes touch electrodes TE(n), TE(n+1), TE(n+2), TE(n+3).

It should be noted that each column of touch electrodes may include touch electrodes 20. FIG. 4 only illustrates two touch electrodes in each column of touch electrodes and does not represent the number of touch electrodes in each column of touch electrodes in practical use.

When m=1 and n=1, the first row and the first column of the touch electrode unit 20a are the touch electrodes TE1. The first row and the first column in the touch electrode unit 20n are touch electrodes TE(n). The gate of the first thin film transistor T1 in the first-stage sub-demultiplexing circuit 51a corresponding to the touch electrode TE1 and the gate of the first thin film transistor T1 in the first-stage sub-demultiplexing circuit 51e corresponding to the touch electrode TE(n) are electrically connected to the touch drive control signal line EN_1. The source of the first thin film transistor T1 in the first-stage sub-demultiplexing circuit 51a corresponding to the touch electrode TE1 and the gate of the first thin film transistor T1 in the first-stage sub-demultiplexing circuit 51e corresponding to the touch electrode TE(n) are electrically connected to the touch drive signal line DR_1.

The gate of the second thin film transistor T2 in the first-stage sub-demultiplexing circuit 51a corresponding to the touch electrode TE1 and the gate of the second thin film transistor T2 in the first-stage sub-demultiplexing circuit 51e corresponding to the touch electrode TE(n) are electrically connected to the touch sensing control signal line SN_1.

When m=1 and n=2, the first row and the second column in the touch electrode unit 20a are the touch electrodes TE3. The first row and the second column in the touch electrode unit 20n are touch electrodes TE(n+2). The gate of the first thin film transistor T1 in the first-stage sub-demultiplexing circuit 51c corresponding to the touch electrode TE2 and the gate of the first thin film transistor T1 of the first-stage sub-demultiplexing circuit 51g corresponding to the touch electrode TE(n+2) are electrically connected to the touch drive control signal line EN_2. The source of the first thin film transistor T1 in the first-stage sub-demultiplexing circuit 51c corresponding to the touch electrode TE3 and the sources of the first thin film transistor T1 of the first-stage sub-demultiplexing circuit 51g corresponding to the touch electrode TE(n+2) are electrically connected to the touch drive signal line DR_3.

The gate of the second thin film transistor T2 in the first-stage sub-demultiplexing circuit 51c corresponding to the touch electrode TE1 and the gate of the second thin film transistor T2 in the first-stage sub-demultiplexing circuit 51g corresponding to the touch electrode TE(n+2) are electrically connected to the touch sensing control signal line SN_3.

In the same touch electrode unit, the gates of the first thin film transistors T1 corresponding to the touch electrodes located in the same row are connected to different touch drive control signal lines EN. The sources of the first thin film transistors T1 corresponding to the touch electrodes located in the same row are connected to different touch drive signal lines DR. The gates of the second thin film transistors T2 corresponding to the touch electrodes located in the same row are connected to different touch sensing control signal lines EN.

Taking the touch electrode unit 20a as an example, when the touch electrode unit 20a is driven, each of the electrodes in the first column is driven first, and then each of the electrodes in the second column is driven in turn. If there are 3 or more rows of touch electrodes in the touch electrode unit 20a, you can refer to the above method to drive each row of touch electrodes in sequence.

It should be noted that the other touch electrodes in the touch electrode unit 20a and the other touch electrodes in the touch electrode unit are connected to their corresponding first pole demultiplexing circuits. You can refer to the connection mode in the above embodiment, which will not be repeated here.

In one of the embodiments, the control end of the second-stage sub-demultiplexing circuit 52 in the demultiplexing circuit unit 40 and the control end of the second-stage sub-demultiplexing circuit 52 in another demultiplexing circuit unit 40 are electrically connected to a different bonding pad 60.

As shown in FIG. 3, the wires of the touch display panel further include a plurality of sensing-channel switch control signal lines SCN and sensing channels SI. The sensing-channel switch control signal lines SCN and the sensing channels SI are respectively electrically connected to different bonding pads 60. The input end of the second-stage sub-demultiplexing circuit 52 is electrically connected to the sensing channel SI. The output end of the second-stage sub-demultiplexing circuit 52 is electrically connected to the corresponding second input end of the first-stage sub-demultiplexing circuits 51.

Taking FIG. 3 as an example, the sensor-channel switch control signal lines SCN include sensor-channel switch control signal lines SCN_1 and SCN_2. The sensing channels SI include sensing channels SI_1 and SI_2. The input end of the second-stage sub-demultiplexing circuit 52a in the first demultiplexing circuit unit 40a is electrically connected to the sensing channel SI_1. The control end of the second-stage sub-demultiplexing circuit 52a in the first demultiplexing circuit unit 40a is electrically connected to the sensing-channel switch control signal line SCN_1. The sensing-channel switch control signal line SCN_1 is electrically connected to the corresponding bonding pad 60.

The input end of the second-stage sub-demultiplexing circuit 52b in the second demultiplexing circuit unit 40b is electrically connected to the input end and electrically connected to the sensing channel SI_2. The control end of the second-stage sub-demultiplexing circuit 52b in the second demultiplexing circuit unit 40b is electrically connected to the sensing-channel switch control signal line SCN_2. The sensing-channel switch control signal line SCN_2 is electrically connected to the corresponding bonding pad 60. In this way, the touch sensing signals are respectively transmitted to the first demultiplexing circuit unit 40a and the second demultiplexing circuit unit 40b through the two bonding pad blocks 60.

Further, the second-stage sub-demultiplexing circuit 52 includes a third thin film transistor T3. Take the second stage sub-demultiplexing circuit 52a as an example, the source of the third thin film transistor T3 of the second stage sub-demultiplexing circuit 52a is electrically connected to the sensing channel SI_1. The gate is electrically connected to the sensing-channel switch control signal line SCN_1. The drain is connected to the source of the first thin film transistors T1 in the first demultiplexing circuit 51a located in the same demultiplexing circuit unit.

In one of the embodiments, the control end of the second-stage sub-demultiplexing circuit 52 in the demultiplexing circuit unit 40 and the control end of the second-stage sub-demultiplexing circuit 52 in another demultiplexing circuit unit 40 are electrically connected to the same bonding pad 60.

Figure 5:
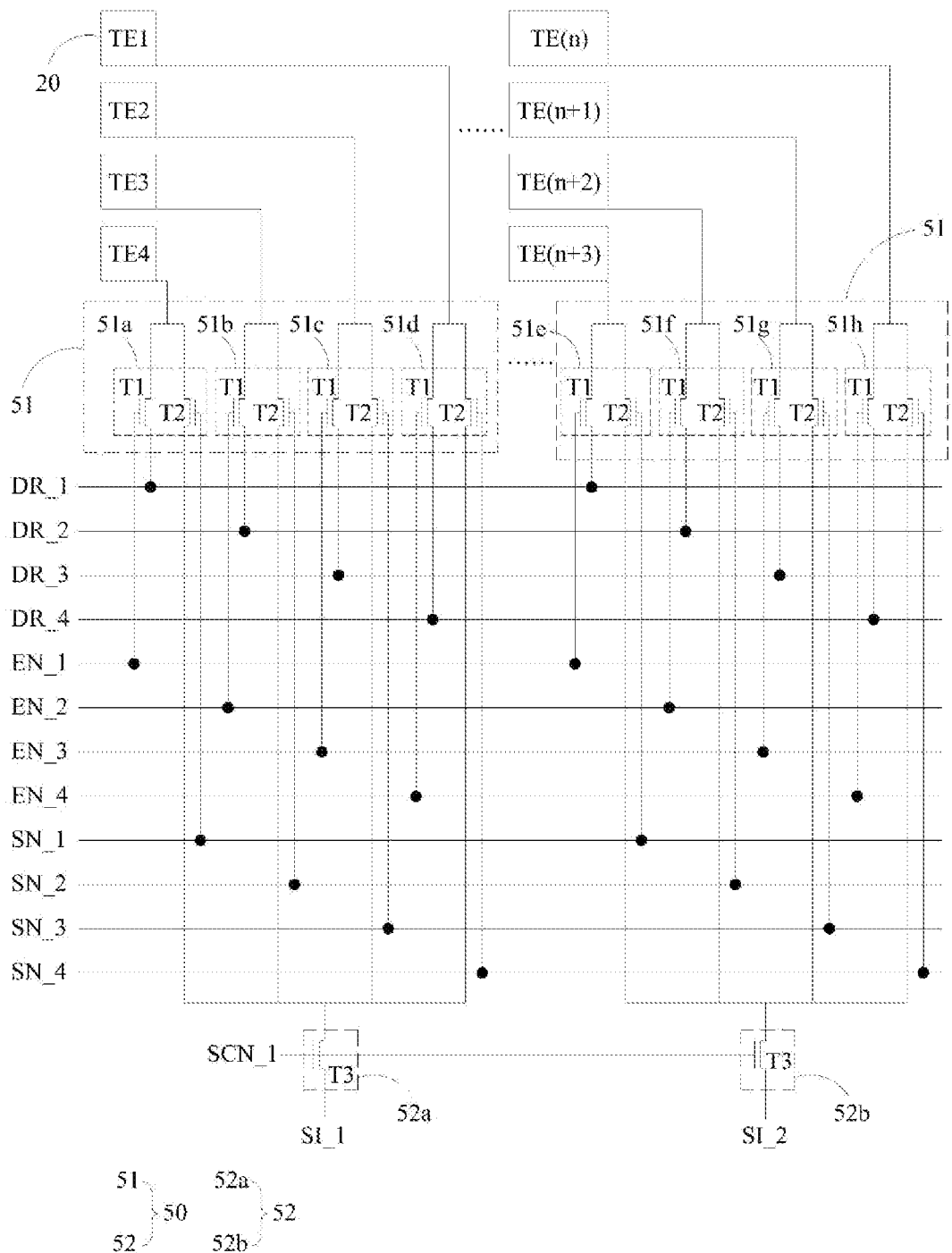
FIG. 5 is a schematic structural diagram of a third demultiplexing circuit unit according to an embodiment of the present disclosure.

As shown in FIG. 5, FIG. 5 is a schematic structural diagram of a third demultiplexing circuit unit according to an embodiment of the present disclosure. The structure of the third type of demultiplexing circuit unit shown in FIG. 5 is substantially the same as that of the second type of demultiplexing circuit unit shown in FIG. 3. The difference is that in the third type of demultiplexing circuit unit shown in FIG. 5, the gate of the third thin film transistor T3 in the demultiplexing circuit unit 40 and the gate of the third thin film transistor T3 in another demultiplexing circuit unit 40 are connected to the same sensing-channel switch control signal line SCN.

Take the first demultiplexing circuit unit 40a and the second demultiplexing circuit unit 40b as an example, in the first demultiplexing circuit unit 40a, the gate of the third thin film transistor T3 of the second sub-demultiplexing circuit 52a is electrically connected to the sensing-channel switch control signal line SCN_1. In the second demultiplexing circuit unit 40b, the gate of the third thin film transistor T3 of the second stage sub-demultiplexing circuit 52b is electrically connected to the sensing-channel switch control signal line SCN_1. The sensing-channel switch control signal line SCN_1 is electrically connected to the corresponding bonding pad 60. The second-stage sub-demultiplexing circuit 52a in the first demultiplexing circuit unit 40a and the second-stage sub-demultiplexing circuit 52b in the second demultiplexing circuit unit 40b are connected through the same sensing-channel switch control signal line SCN_1. The sensing-channel switch control signal may be output to the two demultiplexing circuit units 40a, 40b through a sensing channel switch control signal line SCN_1 and a bonding pad 60 electrically connected to the sensing-channel switch control signal line SCN_1. Compared with the solution shown in FIG. 4, the number of bonding pads 60 may be further reduced.

Figure 6:
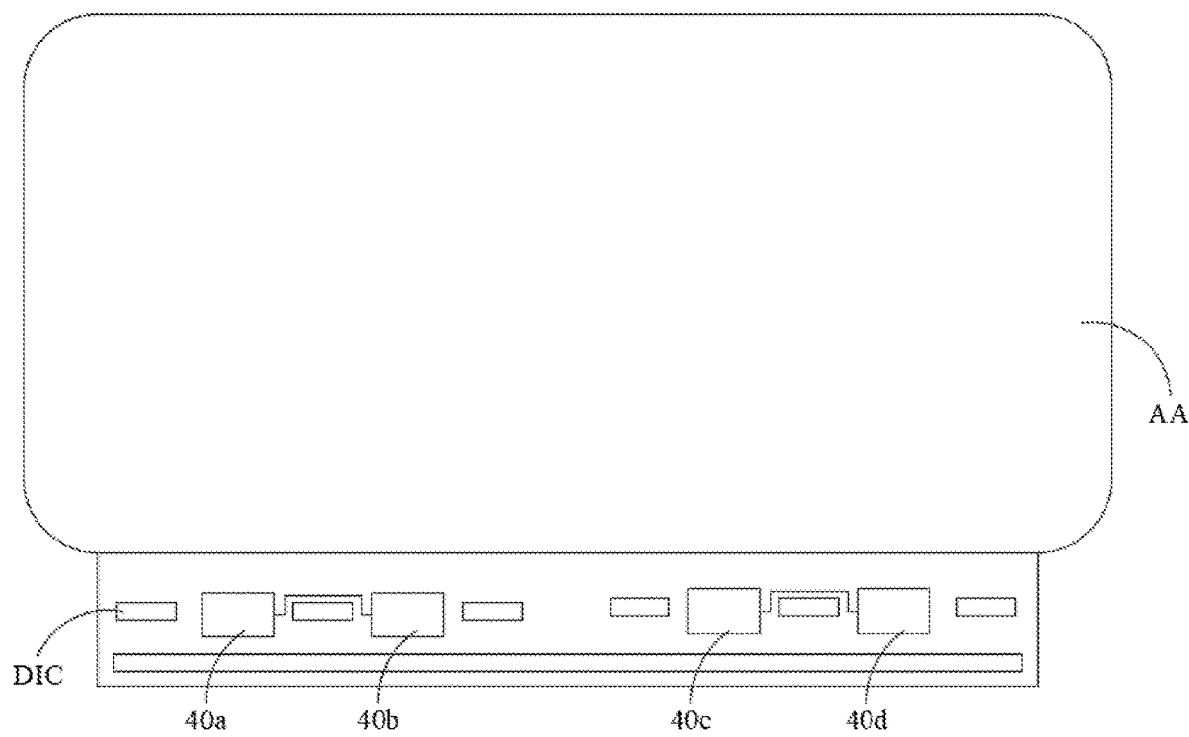
FIG. 6 is a schematic structural diagram of a second touch display panel according to an embodiment of the present disclosure.

As shown in FIG. 6, FIG. 6 is a schematic structural diagram of a second touch display panel according to an embodiment of the present disclosure. It should be noted that the structure of the second touch display panel shown in FIG. 6 is substantially the same as the structure of the first touch display panel shown in FIG. 2, and the demultiplexing circuit units shown in FIGS. 3 to 5 are all applicable to the touch display panel shown in FIGS. 2 and 6. The difference is that the small-sized touch display panel shown in FIG. 2 requires only two sets of demultiplexing circuit units to meet the required touch functions. FIG. 6 shows a medium and large size touch display panel, which requires multiple sets of demultiplexing circuit units to meet its required touch functions.

In the embodiment shown in FIG. 6, the touch display panel may include 4 demultiplexing circuit units, which are demultiplexing circuit units 40a, 40b, 40c, and 40d, respectively. Among them, 40a and 40b, 40c and 40d may be connected in a cascaded manner as shown in FIGS. 3 to 5 in the above embodiment, which may greatly reduce the number of bonding pads in the large and medium-sized touch display panel.

In other embodiments, the number of demultiplexing circuit units may be selected according to the size of the touch display panel, and the number of demultiplexing circuit units can be 2, 3, 4 and more. The number of demultiplexing circuit units cascaded with each other is not limited to two in the above embodiment. It is also possible to connect 3 or more demultiplexing circuit units adjacently arranged in any one of the cascading methods shown in FIG. 3 to FIG. 5, so that the number of bonding pads may also be reduced.

In the embodiments shown in FIGS. 2 to 6, the first thin film transistor T1, the second thin film transistor T2, and the third thin film transistor T3 may be arranged on the same layer as the thin film transistors in the pixel driving circuit of the touch display panel. The touch driving signal line DR, the touch sensing control signal line EN, the touch sensing control signal line SN, and the sensing-channel switch control signal line SCN may be arranged on the same layer as the source, drain or gate of the first thin film transistor T1 and use the same metal film forming process to prepare and form.

An embodiment of the present disclosure further provides an electronic device, which includes the touch display panel as described in the above-mentioned embodiments, a casing for carrying the touch display panel, a processor, a power supply, and other components arranged in the casing for driving the touch display panel to realize a screen display function. The electronic device may be a mobile terminal, such as a smart phone, a tablet computer, a notebook computer, etc., and the electronic device may also be a wearable terminal, such as smart watches, smart bracelets, smart glasses, augmented reality devices, etc., electronic devices can also be fixed terminals, such as desktop computers, TVs, etc.

The embodiments of the present disclosure provide a touch display panel and an electronic device, wherein the electronic device includes the touch display panel. The touch display panel includes a plurality of touch electrodes, at least two demultiplexing circuit units, and a plurality of bonding pads. The touch electrodes are arranged in rows at intervals along a first direction and arranged in columns at intervals along a second direction. The first direction is different from the second direction. The demultiplexing circuit units are electrically connected to the touch electrodes in different columns, each of the demultiplexing circuit units includes a plurality of demultiplexing circuits. At least one demultiplexing circuit in the demultiplexing circuit unit and at least one of the corresponding demultiplexing circuits in another demultiplexing circuit unit are electrically connected to the same bonding pad. The number of bonding pads can be further reduced by electrically connecting the demultiplexing circuits in different demultiplexing circuit units to the same bonding pad.

In summary, although the present disclosure is disclosed as above in preferred embodiments, the above-mentioned preferred embodiments are not intended to limit the present disclosure. Those of ordinary skill in the art may make various changes and modifications without departing from the spirit and scope of this present disclosure. Therefore, the scope of protection of this present disclosure is based on the scope defined by the claims.

What is claimed is:

1. A touch display panel, comprising:
a plurality of touch electrodes arranged in rows at intervals along a first direction and disposed in columns at intervals along a second direction, wherein the first direction is different from the second direction;
at least two demultiplexing circuit units respectively electrically connected to the touch electrodes in different columns, wherein the demultiplexing circuit unit includes a plurality of demultiplexing circuits; and
a plurality of bonding pads;
wherein at least one demultiplexing circuit in the demultiplexing circuit unit and at least one of the corresponding demultiplexing circuits in another demultiplexing circuit unit are electrically connected to the same bonding pad,
wherein the at least one demultiplexing circuit in the demultiplexing circuit unit and the at least one of the corresponding demultiplexing circuits in the another demultiplexing circuit unit are simultaneously driven and electrically connected by wiring,
wherein an output end of the demultiplexing circuit is electrically connected to the touch electrode, an input end of at least one demultiplexing circuit in the demultiplexing circuit unit and an input end of at least one of the corresponding demultiplexing circuits in another demultiplexing circuit unit are electrically connected to the same bonding pad,
wherein a control end of at least one demultiplexing circuit in the demultiplexing circuit unit and a control end of at least one of the corresponding demultiplexing circuits in another demultiplexing circuit unit are electrically connected to the same bonding pad,
wherein the demultiplexing circuit includes first-stage sub-demultiplexing circuits and second-stage sub-demultiplexing circuits arranged in cascade, the second-stage sub-demultiplexing circuits are electrically connected to the corresponding first-stage sub-demultiplexing circuits, and an output end of each of the first-stage sub-demultiplexing circuits is electrically connected to a corresponding touch electrode,
wherein the touch display panel includes touch drive signal lines and touch drive control signal lines, and the touch drive signal lines and the touch drive control signal lines are respectively electrically connected to different bonding pads,
wherein a first input end of at least one first-stage sub-demultiplexing circuit in the demultiplexing circuit unit and a first input end of at least one of the corresponding first-stage sub-demultiplexing circuits in another demultiplexing circuit unit are electrically connected to the same touch drive signal line,
wherein a first control end of at least one first-stage sub-demultiplexing circuit in the demultiplexing circuit unit and a first control end of at least one of the corresponding first-stage sub-demultiplexing circuits in another demultiplexing circuit unit are electrically connected to the same touch drive control signal line,
wherein the first-stage sub-demultiplexing circuit includes a first thin film transistor, and a drain of the first thin film transistor is electrically connected to the corresponding touch electrode, wherein a source of the first thin film transistor corresponding to at least one touch electrode in the m-th row and a source of the first thin film transistor corresponding to another touch electrode in m-th row located in different demultiplexing circuit unit are electrically connected to the same touch drive signal line, wherein a gate of the first thin film transistor corresponding to at least one touch electrode in m-th row and a gate of the first thin film transistor corresponding to another touch electrode in m-th row located in different demultiplexing circuit unit are electrically connected to the same touch drive control signal line, and wherein m is an integer greater than or equal to 1.

2. The touch display panel according to claim 1, wherein the touch display panel further includes a plurality of touch sensing control signal lines;

wherein a second input end of the first-stage sub-demultiplexing circuit is electrically connected to an output end of the second-stage sub-demultiplexing circuit, and a second control end of at least one first-stage sub-demultiplexing circuit in the demultiplexing circuit unit and a second control end of at least one of the corresponding first-stage sub-demultiplexing circuits in another demultiplexing circuit unit are electrically connected to the same touch sensing control signal line.

3. The touch display panel according to claim 2, wherein the first-stage sub-demultiplexing circuit includes a second thin film transistor, a drain of the second thin film transistor and the drain of the first thin film transistor are electrically connected to the same touch electrode, and a source of the second thin film transistor is electrically connected to the output end of the second-stage sub-demultiplexing circuit;

wherein a gate of the second thin film transistor corresponding to at least one touch electrode in the m-th and a gate of the second thin film transistor corresponding to another touch electrode in the m-th located in different demultiplexing circuit unit are electrically connected to the same touch sensing control signal line.

4. The touch display panel according to claim 1, wherein a control end of the second-stage sub-demultiplexing circuit in the demultiplexing circuit unit and a control end of the second-stage sub-demultiplexing circuit in another demultiplexing circuit unit are electrically connected to different bonding pads.

5. A touch display panel, comprising:

a plurality of touch electrodes arranged in rows at intervals along a first direction and disposed in columns at intervals along a second direction, wherein the first direction is different from the second direction;

at least two demultiplexing circuit units respectively electrically connected to the touch electrodes in different columns, wherein the demultiplexing circuit unit includes a plurality of demultiplexing circuits; and a plurality of bonding pads;

wherein at least one demultiplexing circuit in the demultiplexing circuit unit and at least one of the corresponding demultiplexing circuits in another demultiplexing circuit unit are electrically connected to the same bonding pad, wherein the at least one demultiplexing circuit in the demultiplexing circuit unit and the at least one of the corresponding demultiplexing circuits in the another demultiplexing circuit unit are simultaneously driven and electrically connected by wiring, wherein an output end of the demultiplexing circuit is electrically connected to the touch electrode, an input end of at least one demultiplexing circuit in the demultiplexing circuit unit and an input end of at least one of the corresponding demultiplexing circuits in another demultiplexing circuit unit are electrically connected to the same bonding pad, wherein a control end of at least one demultiplexing circuit in the demultiplexing circuit unit and a control end of at least one of the corresponding demultiplexing circuits in another demultiplexing circuit unit are electrically connected to the same bonding pad, wherein the demultiplexing circuit includes first-stage sub-demultiplexing circuits and second-stage sub-demultiplexing circuits arranged in cascade, the second-stage sub-demultiplexing circuits are electrically connected to the corresponding first-stage sub-demultiplexing circuits, and an output end of each of the first-stage sub-demultiplexing circuits is electrically connected to a corresponding touch electrode, and wherein a control end of the second-stage sub-demultiplexing circuit in the demultiplexing circuit unit and a control end of the second-stage sub-demultiplexing circuit in another demultiplexing circuit unit are electrically connected to the same bonding pad.

6. The touch display panel according to claim 5, wherein the touch display panel further includes sensing-channel switch control signal lines and sensing channels, the sensing-channel switch control signal lines and the sensing channels are electrically connected to different bonding pads, respectively, and the second-stage sub-demultiplexing circuit includes a third thin film transistor;

wherein a gate o the third thin film transistor is electrically connected to the sensing-channel switch control signal line, a source of the third thin film transistor is electrically connected to the sensing channel, and a drain of the third thin film transistor is electrically connected to an input end of the first-stage sub-demultiplexing circuits in the same demultiplexing circuit unit.

7. The touch display panel according to claim 6, wherein a gate of the third thin film transistor in the demultiplexing circuit unit and a gate of the third thin film in another demultiplexing circuit unit are connected to the same sensing-channel switch control signal line.

8. An electronic device including a touch display panel, wherein the touch display panel comprise:

a plurality of touch electrodes arranged in rows at intervals along a first direction and disposed in columns at intervals along a second direction, wherein the first direction is different from the second direction;

at least two demultiplexing circuit units respectively electrically connected to the touch electrodes in different columns, wherein the demultiplexing circuit unit includes a plurality of demultiplexing circuits; and a plurality of bonding pads;

wherein at least one demultiplexing circuit in the demultiplexing circuit unit and at least one of the corresponding demultiplexing circuits in another demultiplexing circuit unit are electrically connected to the same bonding pad, wherein the at least one demultiplexing circuit in the demultiplexing circuit unit and the at least one of the corresponding demultiplexing circuits in the another demultiplexing circuit unit are simultaneously driven and electrically connected by wiring, wherein an output end of the demultiplexing circuit is electrically connected to the touch electrode, an input end of at least one demultiplexing circuit in the demultiplexing circuit unit and an input end of at least one of the corresponding demultiplexing circuits in another demultiplexing circuit unit are electrically connected to the same bonding pad, wherein a control end of at least one demultiplexing circuit in the demultiplexing circuit unit and a control end of at least one of the corresponding demultiplexing circuits in another demultiplexing circuit unit are electrically connected to the same bonding pad, wherein the demultiplexing circuit includes first-stage sub-demultiplexing circuits and second-stage sub-demultiplexing circuits arranged in cascade, the second-stage sub-demultiplexing circuits are electrically connected to the corresponding first-stage sub-demultiplexing circuits, and an output end of each of the first-stage sub-demultiplexing circuits is electrically connected to a corresponding touch electrode, wherein the touch display panel includes touch drive signal lines and touch drive control signal lines, and the touch drive signal lines and the touch drive control signal lines are respectively electrically connected to different bonding pads, wherein a first input end of at least one first-stage sub-demultiplexing circuit in the demultiplexing circuit unit and a first input end of at least one of the corresponding first-stage sub-demultiplexing circuits in another demultiplexing circuit unit are electrically connected to the same touch drive signal line, wherein a first control end of at least one first-stage sub-demultiplexing circuit in the demultiplexing circuit unit and a first control end of at least one of the corresponding first-stage sub-demultiplexing circuits in another demultiplexing circuit unit are electrically connected to the same touch drive control signal line, wherein the first-stage sub-demultiplexing circuit includes a first thin film transistor, and a drain of the first thin film transistor is electrically connected to the corresponding touch electrode, wherein a source of the first thin film transistor corresponding to at least one touch electrode in the m-th row and a source of the first thin film transistor corresponding to another touch electrode in m-th row located in different demultiplexing circuit unit are electrically connected to the same touch drive signal line, wherein a gate of the first thin film transistor corresponding to at least one touch electrode in m-th row and a gate of the first thin film transistor corresponding to another touch electrode in m-th row located in different demultiplexing circuit unit are electrically connected to the same touch drive control signal line, and wherein m is an integer greater than or equal to 1.

* * * * *